United States Patent
Zhou et al.

(10) Patent No.: US 12,485,959 B2
(45) Date of Patent: Dec. 2, 2025

(54) MOTOR CONTROL DEVICE

(71) Applicant: JTEKT CORPORATION, Kariya (JP)

(72) Inventors: Xin Zhou, Kiyosu (JP); Naoki Shoji, Shiki-gun (JP); Hidenori Itamoto, Tajima (JP); Terutaka Tamaizumi, Okazaki (JP); Hiromasa Tamaki, Okazaki (JP); Shingo Nitta, Anjo (JP); Shunsuke Tsujii, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 2 days.

(21) Appl. No.: 18/722,299

(22) PCT Filed: Dec. 28, 2021

(86) PCT No.: PCT/JP2021/048964
§ 371 (c)(1),
(2) Date: Jun. 20, 2024

(87) PCT Pub. No.: WO2023/127149
PCT Pub. Date: Jul. 6, 2023

(65) Prior Publication Data
US 2025/0050940 A1     Feb. 13, 2025

(51) Int. Cl.
*B62D 5/04*     (2006.01)
*B62D 6/00*     (2006.01)

(52) U.S. Cl.
CPC ......... *B62D 5/0463* (2013.01); *B62D 5/0409* (2013.01); *B62D 6/00* (2013.01)

(58) Field of Classification Search
CPC .. B62D 15/025; B62D 5/0409; B62D 5/0463; B62D 6/00; B62D 6/007; B62D 6/008;
(Continued)

(56) References Cited

U.S. PATENT DOCUMENTS

2019/0210638 A1 * 7/2019 Ueno ..................... B62D 6/00
2019/0329818 A1   10/2019 Shoji et al.
(Continued)

FOREIGN PATENT DOCUMENTS

| EP | 2842833 A2 | 3/2015 |
|---|---|---|
| JP | 2017-065587 A | 4/2017 |
| JP | 2019-194059 A | 11/2019 |

OTHER PUBLICATIONS

Feb. 15, 2022 International Search Report issued in International Patent Application No. PCT/JP2021/048964.
(Continued)

*Primary Examiner* — Hai H Huynh
*Assistant Examiner* — Johnny H Hoang
(74) *Attorney, Agent, or Firm* — Oliff PLC

(57) ABSTRACT

A manual steering command value calculation unit is configured to use road information including information on a road reaction torque to calculate a manual steering command value when a first condition that at least one of input torques for which a dead zone processing unit is provided is outside a dead zone range is satisfied, and not to use the road information to calculate the manual steering command value when the first condition is not satisfied. When alert vibration torque is being applied, the manual steering command value calculation unit uses the road information to calculate the manual steering command value for a predetermined period from a time when a state in which the first condition is satisfied changes to a state in which the first condition is not satisfied.

5 Claims, 12 Drawing Sheets

(58) Field of Classification Search
CPC ... B62D 5/046; B62D 15/0265; B62D 15/286
USPC .................................................. 701/41–44
See application file for complete search history.

(56) References Cited

U.S. PATENT DOCUMENTS

| | | | |
|---|---|---|---|
| 2020/0269905 A1* | 8/2020 | Sugawara | B62D 5/005 |
| 2020/0269906 A1* | 8/2020 | Nakade | B62D 5/0463 |
| 2022/0063713 A1* | 3/2022 | Shoji | B62D 1/02 |

OTHER PUBLICATIONS

Feb. 5, 2025 Extended European Search Report issued in European Patent Application No. 21970029.1.
Jun. 20, 2024 International Preliminary Report on Patentability issued in International Patent Application No. PCT/JP2021/048964.

* cited by examiner

MOTOR CONTROL DEVICE

TECHNICAL FIELD

The present invention relates to a control device for an electric motor for steering angle control.

BACKGROUND ART

Patent Document 1 below discloses a motor control device that performs angle feedback control on an electric motor based on an integrated angle command value obtained by adding a manual steering command value to an automatic steering command value.

Patent Document 2 below discloses a vehicle steering device including a vibration torque calculation unit that calculates an alert vibration torque when determination is made that the vehicle deviates from a lane, and a current control unit that applies vibration to a steering wheel by controlling an electric motor using the vibration torque calculated by the vibration torque calculation unit. The vibration torque calculation unit sets the value of the vibration torque so that the value of the vibration torque increases as a steering torque detected by a torque sensor increases and the value of the vibration torque decreases as the steering torque decreases. Specifically, the vibration torque calculation unit prestores a map that stores a relationship between the steering torque and the peak value of the vibration torque, and sets the vibration torque based on the steering torque detected by the torque sensor and the map.

RELATED ART DOCUMENTS

Patent Documents

Patent Document 1: Japanese Unexamined Patent Application Publication No. 2019-194059 (JP 2019-194059 A)
Patent Document 2: Japanese Unexamined Patent Application Publication No. 2017-65587 (JP 2017-65587 A)

SUMMARY OF THE INVENTION

Problem to be Solved by the Invention

It is an object of the present invention to provide a motor control device that can control an electric motor based on an integrated angle command value obtained by adding a manual steering command value to an automatic steering command value, and that is suited to apply alert vibration to a steering wheel based on a driving condition of a vehicle.

Means for Solving the Problem

One embodiment of the present invention provides a motor control device that controls drive of an electric motor for steering angle control. The motor control device includes: an assist torque command value setting unit that calculates an assist torque command value using steering torque; a manual steering command value calculation unit that calculates a manual steering command value using the steering torque and the assist torque command value; an integrated angle command value calculation unit that calculates an integrated angle command value by adding the manual steering command value to an automatic steering command value; a control unit that performs angle control on the electric motor based on the integrated angle command value; a dead zone processing unit that, assuming that the steering torque input to the manual steering command value calculation unit, the assist torque command value input to the manual steering command value calculation unit, and the steering torque input to the assist torque command value setting unit are input torques, is provided for at least one of the input torques; and an alert vibration application unit that applies alert vibration torque as a component of a motor torque command value of the electric motor. The manual steering command value calculation unit is configured to use road information including information on a road reaction torque to calculate the manual steering command value when a first condition that the at least one of the input torques for which the dead zone processing unit is provided is outside a dead zone range is satisfied, and not to use the road information to calculate the manual steering command value when the first condition is not satisfied. When the alert vibration torque is being applied, the manual steering command value calculation unit uses the road information to calculate the manual steering command value for a predetermined period from a time when a state in which the first condition is satisfied changes to a state in which the first condition is not satisfied.

With this configuration, it is possible to obtain the motor control device that is suited to apply the alert vibration to the steering wheel based on the driving condition of the vehicle.

The above and other objects, features, and effects of the present invention will become apparent from the following description of an embodiment that will be given with reference to the accompanying drawings.

MODES FOR CARRYING OUT THE INVENTION

Description of Embodiment of Invention

Figure 1:
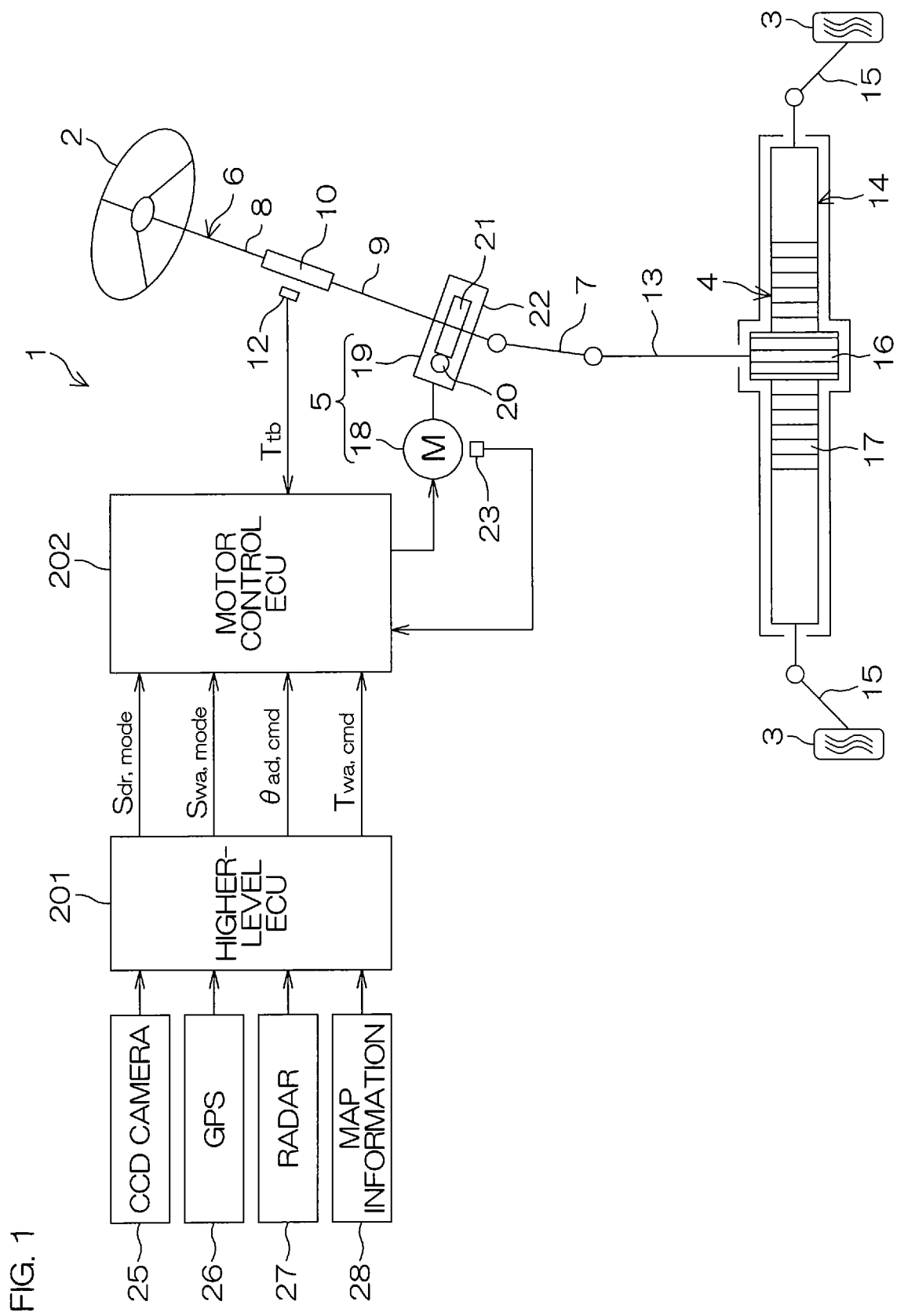
FIG. 1 is a schematic diagram showing a schematic configuration of an electric power steering system to which a motor control device according to an embodiment of the present invention is applied.

One embodiment of the present invention provides a motor control device that controls drive of an electric motor for steering angle control. The motor control device includes: an assist torque command value setting unit that calculates an assist torque command value using steering torque; a manual steering command value calculation unit that calculates a manual steering command value using the steering torque and the assist torque command value; an integrated angle command value calculation unit that calculates an integrated angle command value by adding the manual steering command value to an automatic steering command value; a control unit that performs angle control on the electric motor based on the integrated angle command value; a dead zone processing unit that, assuming that the steering torque input to the manual steering command value calculation unit, the assist torque command value input to the manual steering command value calculation unit, and the steering torque input to the assist torque command value setting unit are input torques, is provided for at least one of the input torques; and an alert vibration application unit that applies alert vibration torque as a component of a motor torque command value of the electric motor. The manual steering command value calculation unit is configured to use road information including information on a road reaction torque to calculate the manual steering command value when a first condition that the at least one of the input torques for which the dead zone processing unit is provided is outside a dead zone range is satisfied, and not to use the road information to calculate the manual steering command value when the first condition is not satisfied. When the alert vibration torque is being applied, the manual steering command value calculation unit uses the road information to calculate the manual steering command value for a predetermined period from a time when a state in which the first condition is satisfied changes to a state in which the first condition is not satisfied.

With this configuration, it is possible to obtain a motor control device that is suited to apply alert vibration to a steering wheel based on a driving condition of a vehicle.

In the one embodiment of the present invention, the dead zone processing unit includes a first dead zone processing unit provided for the steering torque input to the manual steering command value calculation unit, and a second dead zone processing unit provided for the assist torque command value input to the manual steering command value calculation unit.

In the one embodiment of the present invention, the road information is a high frequency component of an estimated value of disturbance torque that is calculated based on an integrated torque command value according to the integrated angle command value and a steering angle, and is applied to a steering shaft.

In the one embodiment of the present invention, the alert vibration application unit is configured to output a vibration torque command value according to a target alert vibration waveform, and the vibration torque command value is added to an integrated torque command value according to the integrated angle command value.

In the one embodiment of the present invention, the alert vibration application unit is configured to output a vibration angle command value according to a target alert vibration waveform, and the vibration angle command value is added to the integrated angle command value.

Detailed Description of Embodiment of Invention

An embodiment of the present invention will be described in detail below with reference to the accompanying drawings.

FIG. 1 is a schematic diagram showing a schematic configuration of an electric power steering system to which a motor control device according to an embodiment of the present invention is applied.

An electric power steering system 1 includes: a steering wheel 2 that is a steering member for steering a vehicle; a steering operation mechanism 4 that steers steered wheels 3 in conjunction with rotation of the steering wheel 2; and a steering assist mechanism 5 that assists a driver in steering. The steering wheel 2 and the steering operation mechanism 4 are mechanically connected via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected via a torsion bar 10 so as to be rotatable relative to each other.

A torque sensor 12 is disposed near the torsion bar 10. The torque sensor 12 detects steering torque (torsion bar torque) $T_{tb}$ applied to the steering wheel 2 based on the amount of relative rotational displacement between the input shaft 8 and the output shaft 9. In the present embodiment, the steering torque $T_{tb}$ that is detected by the torque sensor 12 is such that, for example, the torque for steering to the left is detected as a positive value and the torque for steering to the right is detected as a negative value. It is herein assumed that the magnitude of the steering torque $T_{tb}$ increases as the absolute value thereof increases.

The steering operation mechanism 4 is a rack and pinion mechanism including a pinion shaft 13 and a rack shaft 14 that is a steered shaft. The steered wheels 3 are connected to the ends of the rack shaft 14 via tie rods 15 and knuckle arms (not shown). The pinion shaft 13 is connected to the intermediate shaft 7. The pinion shaft 13 is configured to rotate in conjunction with steering of the steering wheel 2. A pinion 16 is connected to a distal end of the pinion shaft 13.

The rack shaft 14 extends linearly along the right-left direction of the vehicle. A rack 17 that meshes with the pinion 16 is formed on an intermediate portion of the rack shaft 14 in the axial direction. The pinion 16 and the rack 17 convert rotation of the pinion shaft 13 into axial movement of the rack shaft 14. The steered wheels 3 can be steered by moving the rack shaft 14 in the axial direction.

When the steering wheel 2 is steered (rotated), this rotation is transmitted to the pinion shaft 13 via the steering shaft 6 and the intermediate shaft 7. The pinion 16 and the rack 17 convert rotation of the pinion shaft 13 into axial movement of the rack shaft 14. The steered wheels 3 are thus steered.

The steering assist mechanism 5 includes an electric motor 18 that generates a steering assist force (assist torque), and a speed reducer 19 that amplifies output torque of the electric motor 18 and transmits the amplified torque to the steering operation mechanism 4. The speed reducer 19 is a worm gear mechanism including a worm gear 20 and a worm wheel 21 that meshes with the worm gear 20. The speed reducer 19 is housed in a gear housing 22 that is a transmission mechanism housing.

Hereinafter, the reduction ratio (gear ratio) of the speed reducer 19 may be represented by N. The reduction ratio N is defined as a ratio ($\theta_{wg}/\theta_{ww}$) of a worm gear angle $\theta_{wg}$ that is the rotational angle of the worm gear 20 to a worm wheel angle $\theta_{ww}$ that is the rotational angle of the worm wheel 21.

The worm gear 20 is rotationally driven by the electric motor 18. The worm wheel 21 is connected to the output shaft 9 so as to be rotatable together.

When the worm gear 20 is rotationally driven by the electric motor 18, the worm wheel 21 is rotationally driven so that motor torque is applied to the steering shaft 6 and the steering shaft 6 (output shaft 9) is rotated. The rotation of the steering shaft 6 is transmitted to the pinion shaft 13 via the intermediate shaft 7. Rotation of the pinion shaft 13 is converted into axial movement of the rack shaft 14. The steered wheels 3 are thus steered. That is, rotationally driving the worm gear 20 using the electric motor 18 enables steering assist by the electric motor 18 and steering of the steered wheels 3. The electric motor 18 is provided with a rotational angle sensor 23 for detecting the rotational angle of a rotor of the electric motor 18.

The torque that is applied to the output shaft 9 (example of an object to be driven by the electric motor 18) includes motor torque from the electric motor 18 and disturbance torque $T_{lc}$ other than the motor torque. The disturbance torque $T_{lc}$ other than the motor torque includes the steering torque $T_{tb}$, road load torque (road reaction torque) $T_{rl}$, and friction torque $T_f$.

The steering torque $T_{tb}$ is torque that is applied from the steering wheel 2 side to the output shaft 9 due to a force that is applied to the steering wheel 2 by the driver, a force that is generated by steering inertia, etc.

The road load torque $T_{rl}$ is torque that is applied from the steered wheel 3 side to the output shaft 9 via the rack shaft 14 due to self-aligning torque that is generated by a tire, a force that is generated by a suspension and tire wheel alignment, a friction force of the rack and pinion mechanism, etc.

The vehicle is equipped with a CCD (Charge Coupled Device) camera 25 that captures an image of the road ahead of the vehicle in the advancing direction, a GPS (Global Positioning System) 26 that detects the position of the vehicle, a radar 27 that detects a road shape and obstacles, a map information memory 28 that stores map information, etc.

The CCD camera 25, the GPS 26, the radar 27, and the map information memory 28 are connected to a higher-level ECU (ECU: Electronic Control Unit) 201 that performs driving assist control. The higher-level ECU 201 performs surrounding environment recognition, vehicle position estimation, route planning, etc. based on information obtained by the CCD camera 25, the GPS 26, and the radar 27, the map information, etc., and determines control target values for steering and drive actuators.

In the present embodiment, the driving mode includes a normal mode and a driving assist mode. In the present embodiment, in the driving assist mode, the higher-level ECU 201 generates an automatic steering command value $\theta_{ad,cmd}$ for the driving assist mode based on the information obtained by the CCD camera 25, the GPS 26, and the radar 27 and the map information.

In the present embodiment, the driving assist is lane centering assist (LCA) for automatically keeping the vehicle in the center of its lane (lane center). The automatic steering command value $\theta_{ad,cmd}$ is a target value of the steering angle (in the present embodiment, the rotational angle of the pinion shaft 13) for keeping the vehicle centered in its lane.

A process of setting such an automatic steering command value $\theta_{ad,cmd}$ is well known, and therefore will not be described in detail herein. The automatic steering control (driving assist control) may be, for example, lane keeping assist (LKA) control for keeping the vehicle within its lane.

The higher-level ECU 201 determines whether there is a strong possibility that the vehicle will deviate from its lane based on an image captured by the CCD camera 25. In the present embodiment, when the higher-level ECU 201 determines that there is a strong possibility that the vehicle will deviate from its lane, the higher-level ECU 201 generates and outputs a vibration torque command value $T_{wa,cmd}$ according to the waveform of alert vibration (hereinafter referred to as "target alert vibration waveform") to be applied to the steering wheel 2.

Hereinafter, a mode in which the vibration torque command value $T_{wa,cmd}$ is output from the higher-level ECU 201 will be referred to as "alert mode". The higher-level ECU 201 outputs an alert mode signal $S_{wa,mode}$ indicating whether the alert mode is enabled.

The higher-level ECU 201 generates a driving mode signal $S_{dr,mode}$ indicating whether the driving mode is the normal mode or the driving assist mode. The driving mode signal $S_{dr,mode}$, the automatic steering command value $\theta_{ad,cmd}$, the alert mode signal $S_{wa,mode}$, and the vibration torque command value $T_{wa,cmd}$ are provided to a motor control ECU 202 via an in-vehicle network.

The steering torque $T_{tb}$ detected by the torque sensor 12 and an output signal from the rotational angle sensor 23 are input to the motor control ECU 202. The motor control ECU 202 controls the electric motor 18 based on these input signals and information provided from the higher-level ECU 201.

Figure 2:
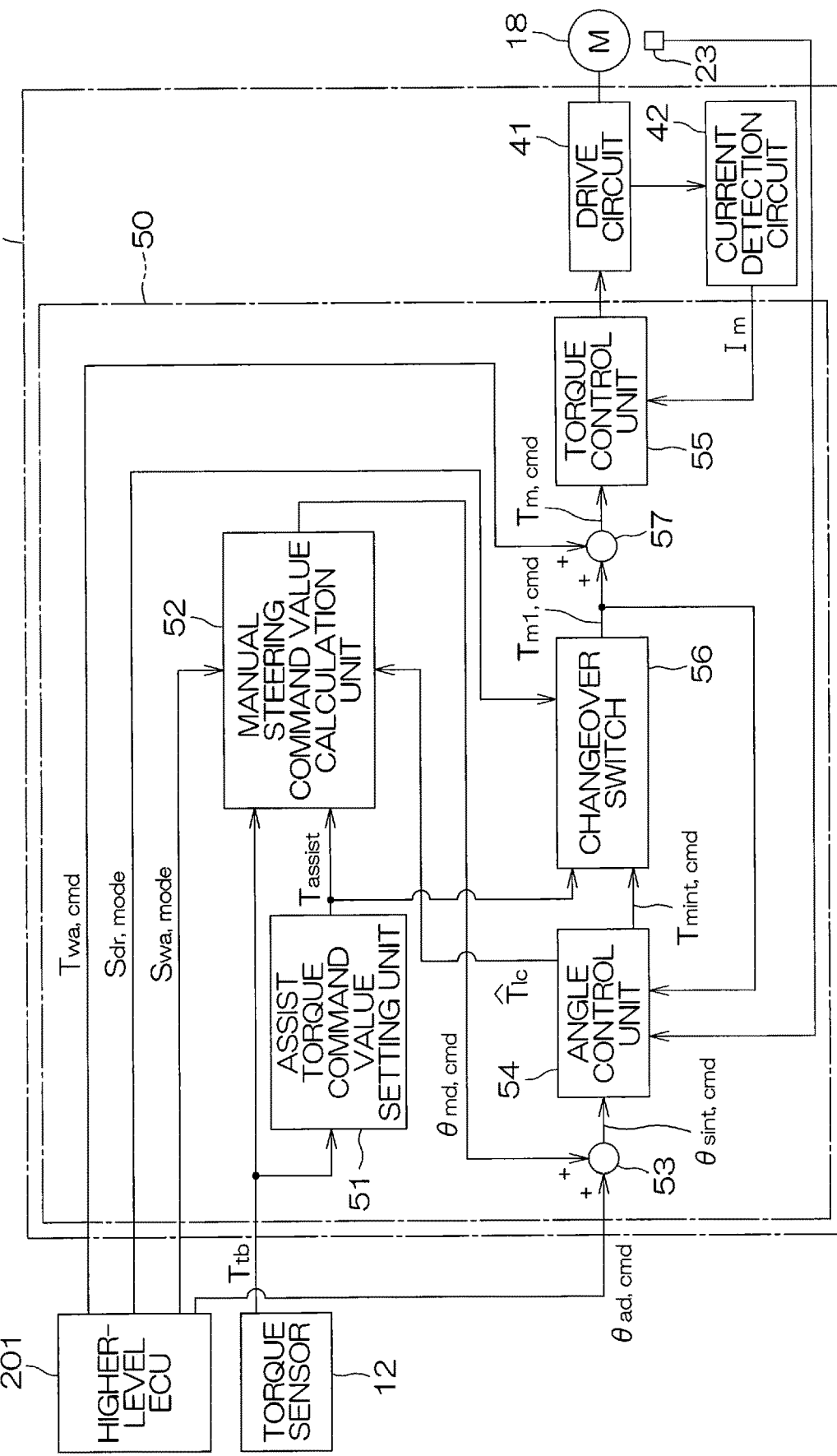
FIG. 2 is a block diagram illustrating an electrical configuration of a motor control ECU.

FIG. 2 is a block diagram illustrating an electrical configuration of the motor control ECU 202.

The case where the driving mode is the driving assist mode will be mainly described below.

The motor control ECU 202 includes a microcomputer 50, a drive circuit (inverter circuit) 41 that is controlled by the microcomputer 50 and supplies electric power to the electric motor 18, and a current detection circuit 42 that detects a current flowing through the electric motor 18 (hereinafter referred to as "motor current I").

The microcomputer 50 includes a CPU and a memory (such as a ROM, a RAM, and a non-volatile memory), and functions as a plurality of functional processing units by executing a predetermined program. The plurality of functional processing units includes an assist torque command value setting unit 51, a manual steering command value calculation unit 52, an integrated angle command value calculation unit 53, an angle control unit 54, a torque control unit (current control unit) 55, a changeover switch 56, and an addition unit 57.

Figure 3:
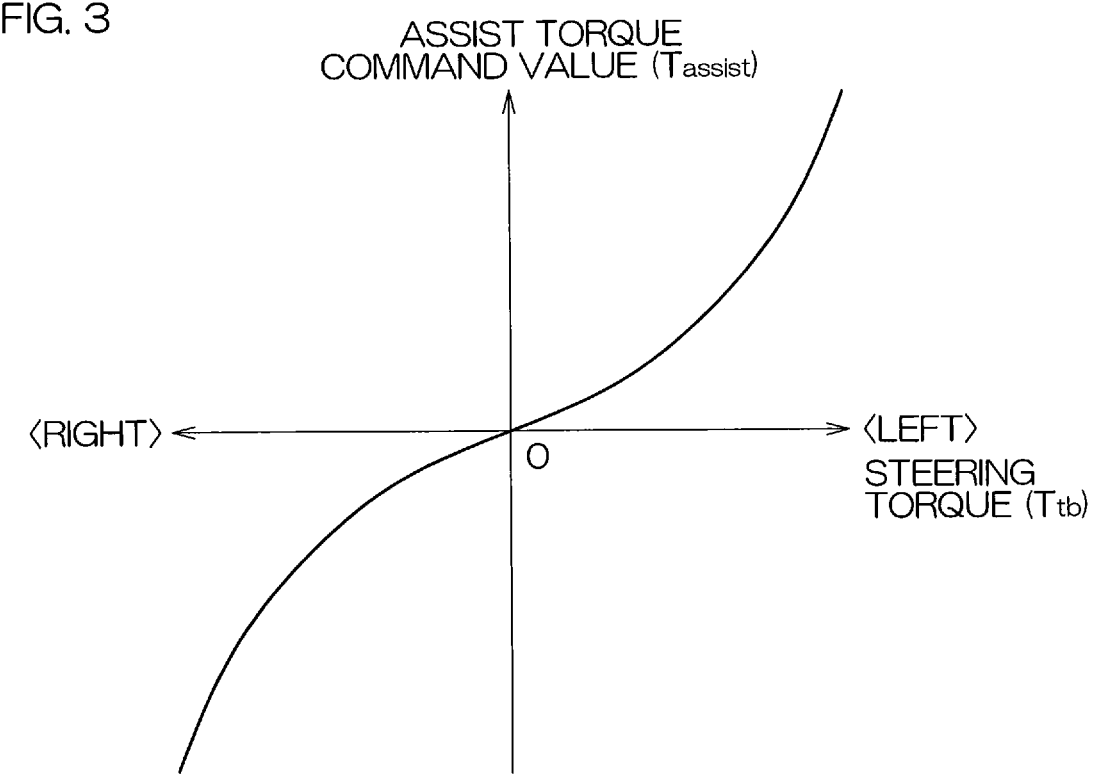
FIG. 3 is a graph showing an example of setting an assist torque command value $T_{as}$ with respect to steering torque $T_{tb}$.

The assist torque command value setting unit 51 sets an assist torque command value $T_{assist}$ that is a target value of the assist torque necessary for a manual operation. The assist torque command value setting unit 51 sets the assist torque command value $T_{assist}$ based on the steering torque $T_{tb}$ detected by the torque sensor 12. An example of setting the assist torque command value $T_{assist}$ with respect to the steering torque $T_{tb}$ is shown in FIG. 3.

The assist torque command value $T_{assist}$ is set to a positive value when the electric motor 18 should generate a steering assist force for steering to the left, and is set to a negative value when the electric motor 18 should generate a steering assist force for steering to the right. The assist torque command value $T_{assist}$ is positive for a positive value of the steering torque $T_{tb}$, and is negative for a negative value of the steering torque $T_{tb}$. The assist torque command value $T_{assist}$ is set so that its absolute value increases as the absolute value of the steering torque $T_{tb}$ increases. The assist torque command value $T_{assist}$ is input to a first input terminal of the changeover switch 56.

The assist torque command value setting unit 51 may set the assist torque command value $T_{assist}$ also in consideration of a vehicle speed detected by a vehicle speed sensor (not shown). In this case, the assist torque command value $T_{assist}$ is set so that its absolute value increases as the absolute value of the steering torque $T_{tb}$ increases and its absolute value decreases as the vehicle speed increases.

The assist torque command value setting unit 51 may calculate the assist torque command value $T_{assist}$ by multiplying the steering torque $T_{tb}$ by a preset constant.

The manual steering command value calculation unit 52 is provided to, when the driver operates the steering wheel 2, set the steering angle (more exactly, the rotational angle of the pinion shaft 13) that matches the steering wheel operation as a manual steering command value $\theta_{md,cmd}$. The manual steering command value calculation unit 52 generates the manual steering command value $\theta\theta_{md,cmd}$ using the steering torque $T_{tb}$ detected by the torque sensor 12 and the assist torque command value $T_{assist}$ set by the assist torque command value setting unit 51. The manual steering command value calculation unit 52 will be described in detail later.

The integrated angle command value calculation unit 53 calculates an integrated angle command value $\theta_{sint,cmd}$ by adding the manual steering command value $\theta_{md,cmd}$ to the automatic steering command value $\theta_{ad,cmd}$ set by the higher-level ECU 201.

The angle control unit 54 calculates an integrated motor torque command value $T_{mint,cmd}$ that matches the integrated angle command value $\theta_{sint,cmd}$ based on the integrated angle command value $\theta_{sint,cmd}$. The integrated motor torque command value $T_{mint,cmd}$ is input to a second input terminal of the changeover switch 56. The integrated motor torque command value $T_{mint}$ is an example of the "integrated torque command value" in the present invention. The angle control unit 54 will be described in detail later.

The changeover switch 56 outputs one of the assist torque command value $T_{assist}$ and the integrated motor torque command value $T_{mint,cmd}$ as a first motor torque command value $T_{m1,cmd}$ depending on the driving mode signal $S_{dr,mode}$. Specifically, when the driving mode is the driving assist mode, the changeover switch 56 outputs the integrated motor torque command value $T_{mint,cmd}$ as the first motor torque command value $T_{m1,cmd}$. The first motor torque command value $T_{m1,cmd}$ is provided to the addition unit 57.

When the driving mode is the normal mode, the changeover switch 56 outputs the assist torque command value $T_{assist}$ as the first motor torque command value $T_{m1,cmd}$. The first motor torque command value $T_{m1,cmd}$ is provided to the addition unit 57.

When the vibration torque command value $T_{wa,cmd}$ is not output from the higher-level ECU 201, the addition unit 57 calculates the first motor torque command value $T_{m1,cmd}$ as a final motor torque command value $T_{m,cmd}$. When the vibration torque command value $T_{wa,cmd}$ is output from the higher-level ECU 201, the addition unit 57 calculates a value obtained by adding the first motor torque command value $T_{m1,cmd}$ and the vibration torque command value $T_{wa,cmd}$ as the final motor torque command value $T_{m,cmd}$.

The torque control unit 55 drives the drive circuit 41 so that the motor torque of the electric motor 18 is brought closer to the motor torque command value $T_{m,cmd}$.

Figure 4:
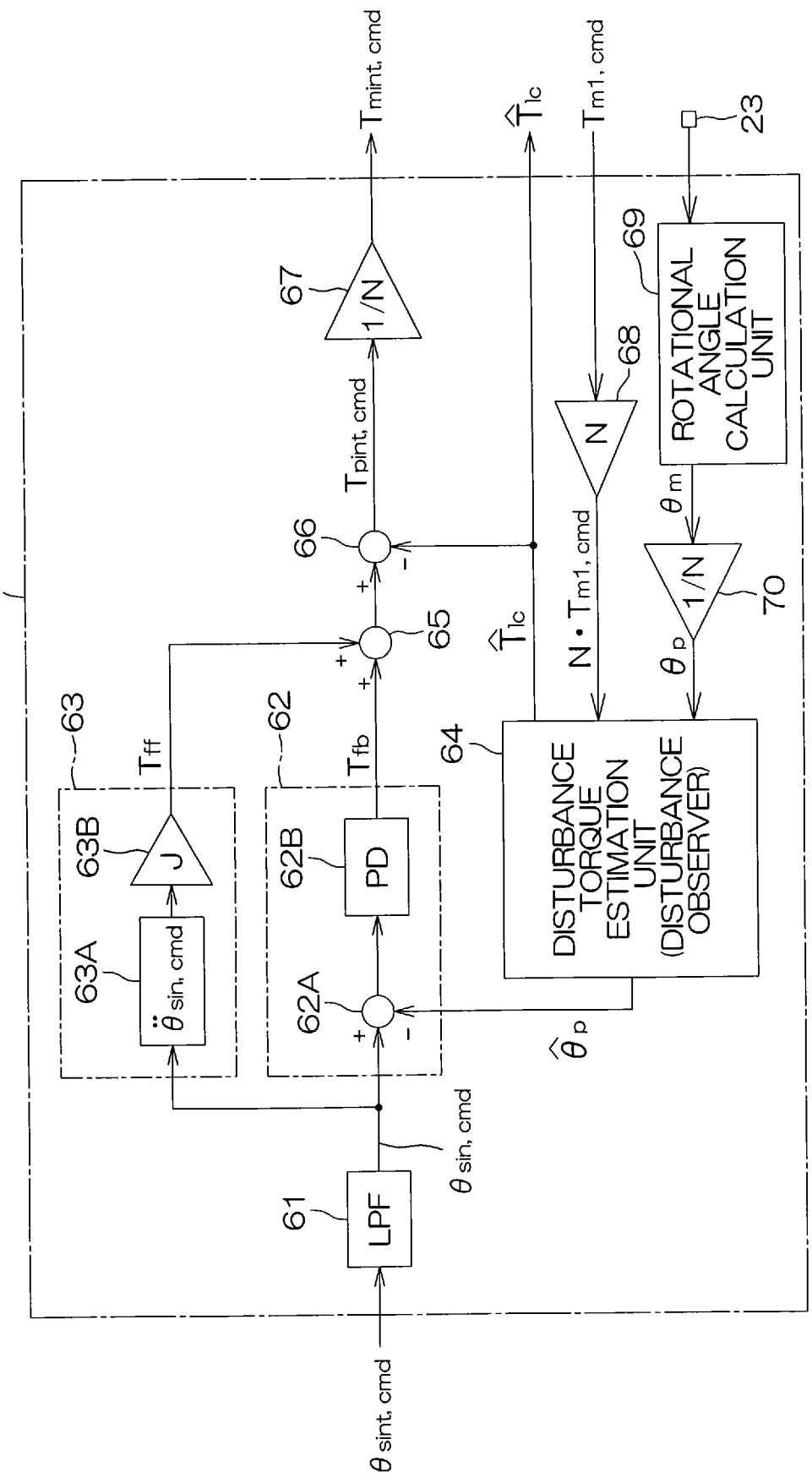
FIG. 4 is a block diagram showing the configuration of an angle control unit.

FIG. 4 is a block diagram showing the configuration of the angle control unit 54.

The angle control unit 54 calculates the integrated motor torque command value $T_{mint,cmd}$ based on the integrated angle command value $\theta_{sint,cmd}$. The angle control unit 54 includes a low-pass filter (LPF) 61, a feedback control unit 62, a feedforward control unit 63, a disturbance torque estimation unit 64, a torque addition unit 65, a disturbance torque compensation unit 66, a first reduction ratio division unit 67, a reduction ratio multiplication unit 68, a rotational angle calculation unit 69, and a second reduction ratio division unit 70.

The reduction ratio multiplication unit 68 converts the first motor torque command value $T_{m1,cmd}$ calculated by the changeover switch 56 (see FIG. 2) into a pinion shaft torque command value $N \cdot T_{m1,cmd}$ that acts on the pinion shaft 13 (worm wheel 21) by multiplying the first motor torque command value $T_{m1,cmd}$ by the reduction ratio N of the speed reducer 19.

The rotational angle calculation unit 69 calculates a rotor rotational angle $\theta_m$ of the electric motor 18 based on an output signal from the rotational angle sensor 23. The second reduction ratio division unit 70 converts the rotor rotational angle $\theta_m$ calculated by the rotational angle calculation unit 69 into a rotational angle (actual steering angle) $\theta_p$ of the pinion shaft 13 by dividing the rotor rotational angle $\theta_m$ by the reduction ratio N.

The low-pass filter 61 performs a low-pass filtering process on the integrated angle command value $\theta_{sint,cmd}$. An integrated angle command value $\theta_{sin,cmd}$ after the low-pass filtering process is provided to the feedback control unit 62 and the feedforward control unit 63.

The feedback control unit 62 is provided to bring an estimated steering angle value $\hat{\theta}_p$ calculated by the disturbance torque estimation unit 64 closer to the integrated angle command value $\theta_{sin,cmd}$ after the low-pass filtering process. The feedback control unit 62 includes an angle deviation calculation unit 62A and a PD control unit 62B. The angle deviation calculation unit 62A calculates a deviation $\Delta\theta$ ($=\theta_{sin,cmd}-\hat{\theta}_p$) between the integrated angle command value $\theta_{sin,cmd}$ and the estimated steering angle value $\hat{\theta}_p$. The angle deviation calculation unit 62A may calculate, as the angle deviation $\Delta\theta$, a deviation ($\theta_{sin,cmd}-\theta_p$) between the integrated angle command value $\theta_{sin}$ and the steering angle $\theta_p$ calculated by the second reduction ratio division unit 70.

The PD control unit 62B calculates feedback control torque $T_{fb}$ by performing PD calculation (proportional-derivative calculation) for the angle deviation $\Delta\theta$ calculated by the angle deviation calculation unit 62A. The feedback control torque $T_{fb}$ is provided to the torque addition unit 65.

The feedforward control unit 63 is provided to improve control response by compensating for a delay in response due to the inertia of the electric power steering system 1. The feedforward control unit 63 includes an angular acceleration calculation unit 63A and an inertia multiplication unit 63B. The angular acceleration calculation unit 63A calculates a target angular acceleration $d^2\theta_{sin,cmd}/dt^2$ by obtaining the second derivative of the integrated angle command value $\theta_{sin,cmd}$.

The inertia multiplication unit 63B calculates feedforward control torque $T_{ff}(=J \cdot d^2\theta_{sin,cmd}/dt^2)$ by multiplying the target angular acceleration $d^2\theta_{sin,cmd}/dt^2$ calculated by the angular acceleration calculation unit 63A by an inertia J of the electric power steering system 1. The inertia J is obtained from, for example, a physical model 121 (see FIG. 5) of the electric power steering system 1 described later. The feedforward control torque TR is provided to the torque addition unit 65 as an inertia compensation value.

The torque addition unit 65 calculates a basic torque command value ($T_{fb}+T_{ff}$) by adding the feedforward control torque $T_{ff}$ to the feedback control torque $T_{fb}$.

The disturbance torque estimation unit 64 is provided to estimate non-linear torque (disturbance torque: torque other than the motor torque) that is generated as disturbance in a plant (object to be controlled by the electric motor 18). The disturbance torque estimation unit 64 estimates the disturbance torque (disturbance load) $T_{lc}$, the steering angle $\theta_p$, and a steering angle differential value (angular velocity) $d\theta_p/dt$ based on the pinion shaft torque command value $N \cdot T_{m1,cmd}$ and the steering angle $\theta_p$. The estimated values of the disturbance torque $T_{lc}$, the steering angle $\theta_p$, and the steering angle differential value (angular velocity) $d\theta_p/dt$ are represented by $\hat{T}_{lc}$, $\hat{\theta}_p$, and $d\hat{\theta}_p/dt$, respectively. The disturbance torque estimation unit 64 will be described in detail later.

The estimated disturbance torque value $\hat{T}_{lc}$ calculated by the disturbance torque estimation unit 64 is provided to the disturbance torque compensation unit 66 as a disturbance torque compensation value and to the manual steering command value calculation unit 52 (see FIG. 2). The estimated steering angle value $\hat{\theta}_p$ calculated by the disturbance torque estimation unit 64 is provided to the angle deviation calculation unit 62A.

The disturbance torque compensation unit 66 calculates an integrated steering torque command value $T_{pint,cmd}$ ($=T_{fb}+T_{ff}-\hat{T}_{lc}$) by subtracting the estimated disturbance torque value $\hat{T}_{lc}$ from the basic torque command value ($T_{fb}+T_{ff}$). The integrated steering torque command value $T_{pint,cmd}$ (torque command value for the pinion shaft 13) with the disturbance torque compensated for is thus obtained.

The integrated steering torque command value $T_{pint,cmd}$ is provided to the first reduction ratio division unit 67. The first reduction ratio division unit 67 calculates the integrated motor torque command value $T_{mint,cmd}$ by dividing the integrated steering torque command value $T_{pint,cmd}$ by the reduction ratio N. The integrated motor torque command value $T_{mint,cmd}$ is provided to the changeover switch 56 (see FIG. 2).

The disturbance torque estimation unit 64 will be described in detail. The disturbance torque estimation unit 64 is a disturbance observer that estimates the disturbance torque $T_{lc}$, the steering angle $\theta_p$, and the angular velocity $d\theta_p/dt$ using, for example, the physical model 121 of the electric power steering system 1 shown in FIG. 5.

The physical model 121 includes a plant (example of an object to be driven by the motor) 122 that includes the output shaft 9 and the worm wheel 21 fixed to the output shaft 9. The steering torque $T_{tb}$ is applied from the steering wheel 2 to the plant 122 via the torsion bar 10, and the road reaction torque $T_{rl}$ is applied from the steered wheel 3 side to the plant 122.

Moreover, the pinion shaft torque command value $N \cdot T_{m1,cmd}$ is applied to the plant 122 via the worm gear 20, and the friction torque $T_f$ is applied to the plant 122 due to the friction between the worm wheel 21 and the worm gear 20.

An equation of motion for the inertia of the physical model 121 is given by the following expression (3), where J is the inertia of the plant 122.

[Math. 1]

$$J\ddot{\theta}_p = N \cdot T_m + T_{lc} \quad (3)$$

$$T_{lc} = T_{tb} + T_{rl} + T_f$$

$d^2\theta_p/dt^2$ is the angular acceleration of the plant 122. N is the reduction ratio of the speed reducer 19. $T_{lc}$ represents the disturbance torque other than the motor torque that is applied to the plant 122. While the disturbance torque $T_{lc}$ is shown as the sum of the steering torque $T_{tb}$, the road reaction torque $T_{rl}$, and the friction torque $T_f$ in the present embodiment, the disturbance torque $T_{lc}$ actually includes torque other than these.

Figure 5:
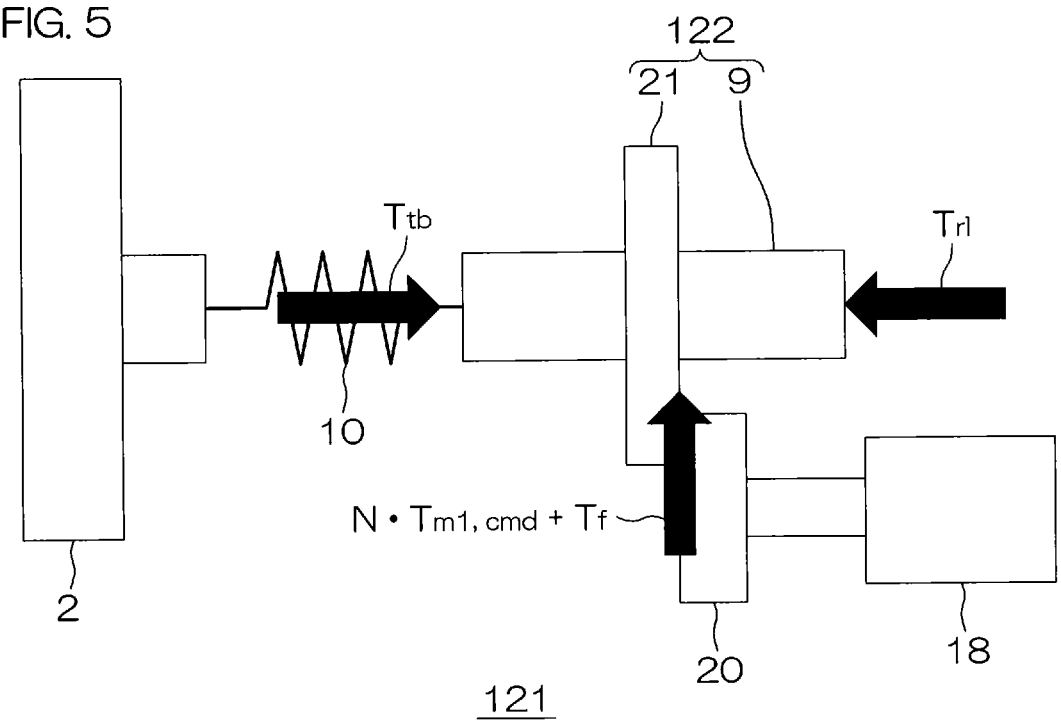
FIG. 5 is a schematic diagram showing an example of the configuration of a physical model of the electric power steering system.

An equation of state for the physical model 121 in FIG. 5 is given by the following expression (4).

[Math. 2]

$$\begin{cases} \dot{x} = Ax + B_1u_1 + B_2u_2 \\ y = Cx + Du_1 \end{cases} \quad (4)$$

In the above expression (4), x is a state variable vector, $u_1$ is a known input vector, $u_2$ is an unknown input vector, and y is an output vector (measured value). In the above expression (4), A is a system matrix, $B_1$ is a first input matrix, $B_2$ is a second input matrix, C is an output matrix, and D is a direct feedthrough matrix.

The above equation of state is extended to a system including the unknown input vector $u_2$ as one of the states. An equation of state of the extended system (extended equation of state) is given by the following expression (5).

[Math. 3]

$$\begin{cases} \dot{x}_e = A_e x_e + B_e u_1 \\ y = C_e x_e \end{cases} \quad (5)$$

In the above expression (5), $x_e$ is a state variable vector of the extended system, and is given by the following expression (6).

[Math. 4]

$$x_e = \begin{bmatrix} x \\ u2 \end{bmatrix} \quad (6)$$

In the above expression (5), $A_e$ is a system matrix of the extended system, $B_e$ is a known input matrix of the extended system, and $C_e$ is an output matrix of the extended system.

A disturbance observer (extended state observer) given by the equation of the following expression (7) is constructed from the extended equation of state given by the above expression (5).

[Math. 5]

$$\begin{cases} \dot{\hat{x}}_e = A_e \hat{x}_e + B_e u_1 + L(y - \hat{y}) \\ \hat{y} = C_e \hat{x}_e \end{cases} \quad (7)$$

In the expression (7), $\hat{x}_e$ represents an estimated value of $x_e$. L is an observer gain. $\hat{y}$ represents an estimated value of y. $\hat{x}_e$ is given by the following expression (8).

[Math. 6]

$$\hat{x}_e = \begin{bmatrix} \hat{\theta}_p \\ \dot{\hat{\theta}}_p \\ \hat{T}_{lc} \end{bmatrix} \quad (8)$$

In the expression (8), $\hat{\theta}_p$ is an estimated value of $\theta_p$, and $\hat{T}_{lc}$ is an estimated value of $T_{lc}$.

The disturbance torque estimation unit 64 calculates the state variable vector $\hat{x}_c$ based on the equation of the above expression (7).

Figure 6:
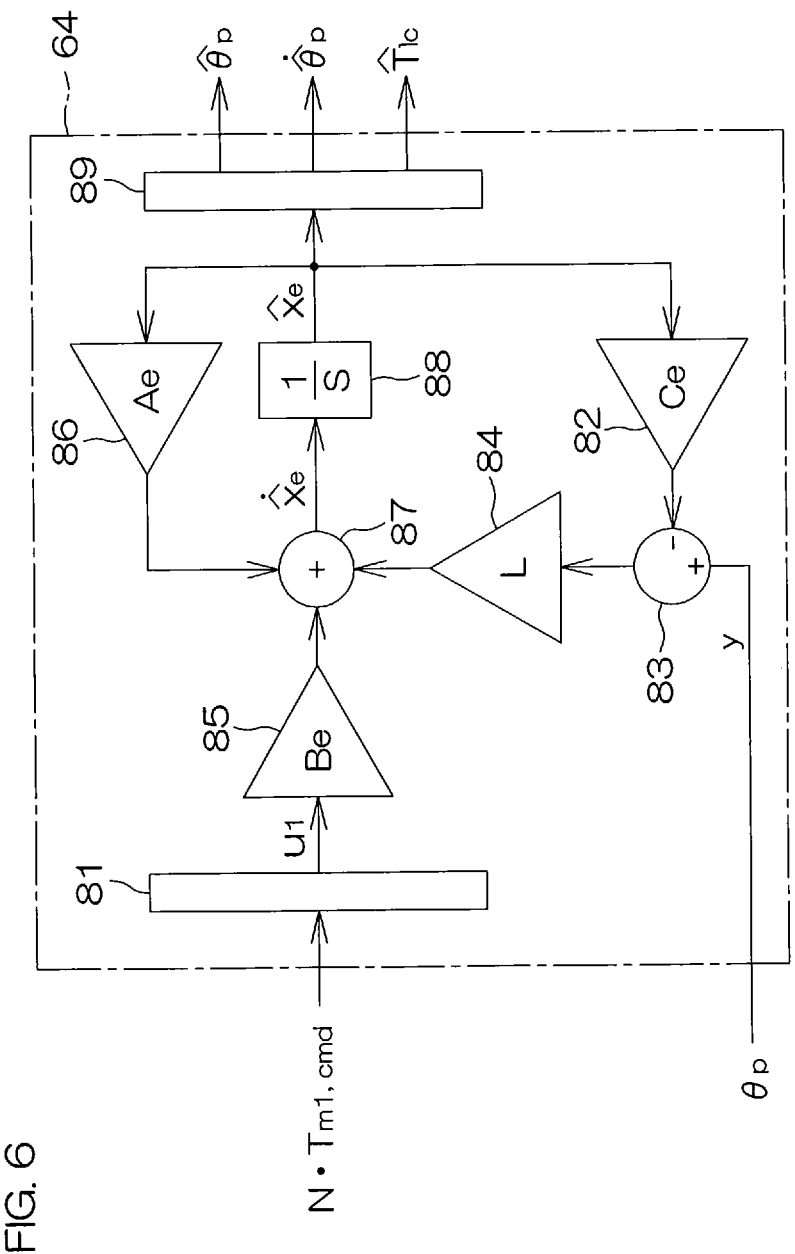
FIG. 6 is a block diagram showing the configuration of a disturbance torque estimation unit.

FIG. 6 is a block diagram showing the configuration of the disturbance torque estimation unit 64.

The disturbance torque estimation unit 64 includes an input vector input unit 81, an output matrix multiplication unit 82, a first addition unit 83, a gain multiplication unit 84, an input matrix multiplication unit 85, a system matrix multiplication unit 86, a second addition unit 87, an integration unit 88, and a state variable vector output unit 89.

The pinion shaft torque command value $N \cdot T_{m1,cmd}$ calculated by the reduction ratio multiplication unit 68 (see FIG. 4) is provided to the input vector input unit 81. The input vector input unit 81 outputs the input vector $u_1$.

The output of the integration unit 88 is the state variable vector $\hat{x}_e$ (see the above expression (8)). At the start of the calculation, an initial value is given as the state variable vector $\hat{x}_e$. The initial value of the state variable vector $\hat{x}_e$ is, for example, 0.

The system matrix multiplication unit 86 multiplies the state variable vector $\hat{x}_e$ by the system matrix $A_e$. The output matrix multiplication unit 82 multiplies the state variable vector $\hat{x}_e$ by the output matrix $C_e$.

The first addition unit 83 subtracts the output ($C_e \cdot \hat{x}_e$) of the output matrix multiplication unit 82 from the output vector (measured value) y that is the steering angle $\theta_p$ calculated by the second reduction ratio division unit 70 (see FIG. 4). That is, the first addition unit 83 calculates the difference (y−ŷ) between the output vector y and the estimated output vector value $\hat{y}$ (=$C_e \cdot \hat{x}_e$). The gain multiplication unit 84 multiplies the output (y−ŷ) of the first addition unit 83 by the observer gain L (see the above expression (7)).

The input matrix multiplication unit 85 multiplies the input vector $u_1$ output from the input vector input unit 81 by the input matrix $B_e$. The second addition unit 87 calculates a differential value $d\hat{x}_e/dt$ of the state variable vector by adding the output ($B_e \cdot u_1$) of the input matrix multiplication unit 85, the output ($A_e \cdot \hat{x}_e$) of the system matrix multiplication unit 86, and the output (L(y−ŷ)) of the gain multiplication unit 84. The integration unit 88 calculates the state variable vector $\hat{x}_e$ by integrating the output ($d\hat{x}_e/dt$) of the second addition unit 87. The state variable vector output unit 89 calculates the estimated disturbance torque value $\hat{T}_{lc}$, the estimated steering angle value $\hat{\theta}$, and the estimated angular velocity value $d\hat{\theta}/dt$ based on the state variable vector $\hat{x}_e$.

Unlike the extended state observer described above, a typical disturbance observer is composed of an inverse model of the plant and a low-pass filter. An equation of motion of the plant is given by the expression (3) as described above. Thus, the inverse model of the plant is given by the following expression (9).

[Math. 7]

$$T_{lc} = J\ddot{\theta}_p - N \cdot T_{m1,cmd} \quad (9)$$

The inputs to the typical disturbance observer are $J \cdot d^2\theta_p/dt^2$ and $N \cdot T_{m1,cmd}$. Since the second derivative of the steering angle $\theta_p$ is used, noise of the rotational angle sensor 23 has a great influence. On the other hand, the extended state observer according to the embodiment described above estimates the disturbance torque using an integral type. Therefore, the influence of noise due to differentiation can be reduced.

The typical disturbance observer composed of the inverse model of the plant and the low-pass filter may be used as the disturbance torque estimation unit 64.

Figure 7:
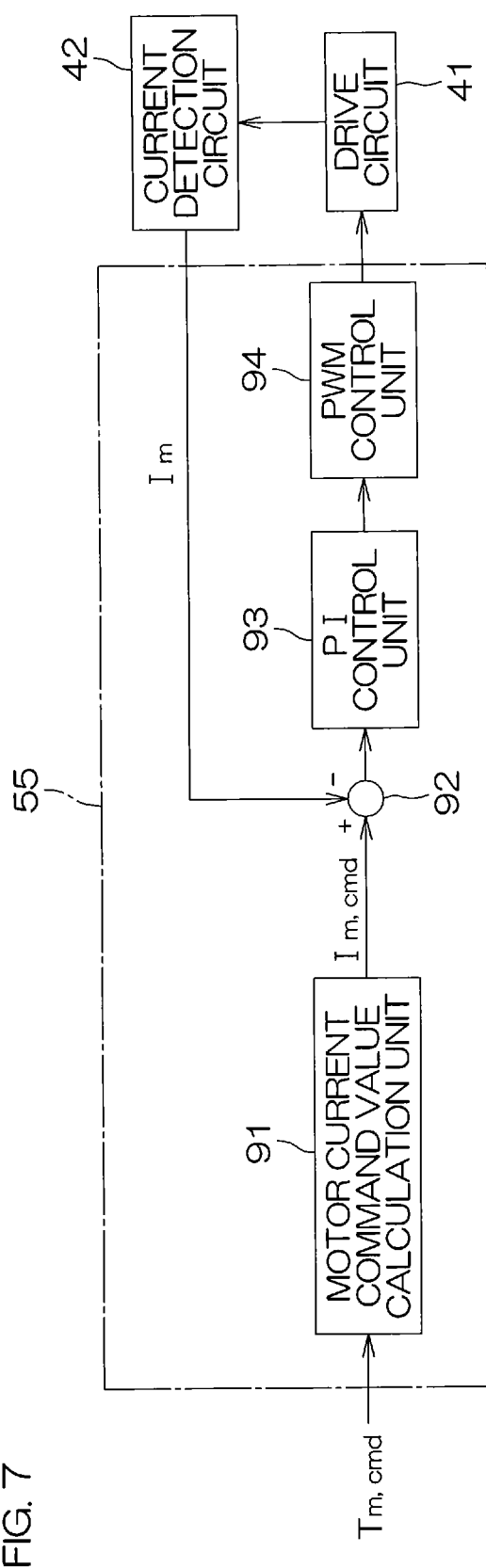
FIG. 7 is a schematic diagram showing the configuration of a torque control unit.

FIG. 7 is a schematic diagram showing the configuration of the torque control unit 55.

The torque control unit 55 (see FIG. 2) includes a motor current command value calculation unit 91, a current deviation calculation unit 92, a PI control unit 93, and a PWM (Pulse Width Modulation) control unit 94.

The motor current command value calculation unit 91 calculates a motor current command value $I_{m,cmd}$ by dividing the motor torque command value $T_{m,cmd}$ calculated by the addition unit 57 (see FIG. 2) by a torque constant $K_t$ of the electric motor 18.

The current deviation calculation unit 92 calculates a deviation $\Delta I$ (=$I_{m,cmd} - I_m$) between the motor current command value $I_{m,cmd}$ obtained by the motor current command value calculation unit 91 and a motor current $I_m$ detected by the current detection circuit 42.

The PI control unit 93 generates a drive command value for controlling the motor current $I_m$ flowing through the electric motor 18 to the motor current command value $I_{m,cmd}$ by performing PI calculation (proportional-integral calculation) for the current deviation $\Delta I$ calculated by the current deviation calculation unit 92. The PWM control unit 94 generates a PWM control signal with a duty cycle corresponding to the drive command value, and supplies the PWM control signal to the drive circuit 41. Electric power corresponding to the drive command value is thus supplied to the electric motor 18.

The manual steering command value calculation unit 52 will be described in detail below.

Figure 8:
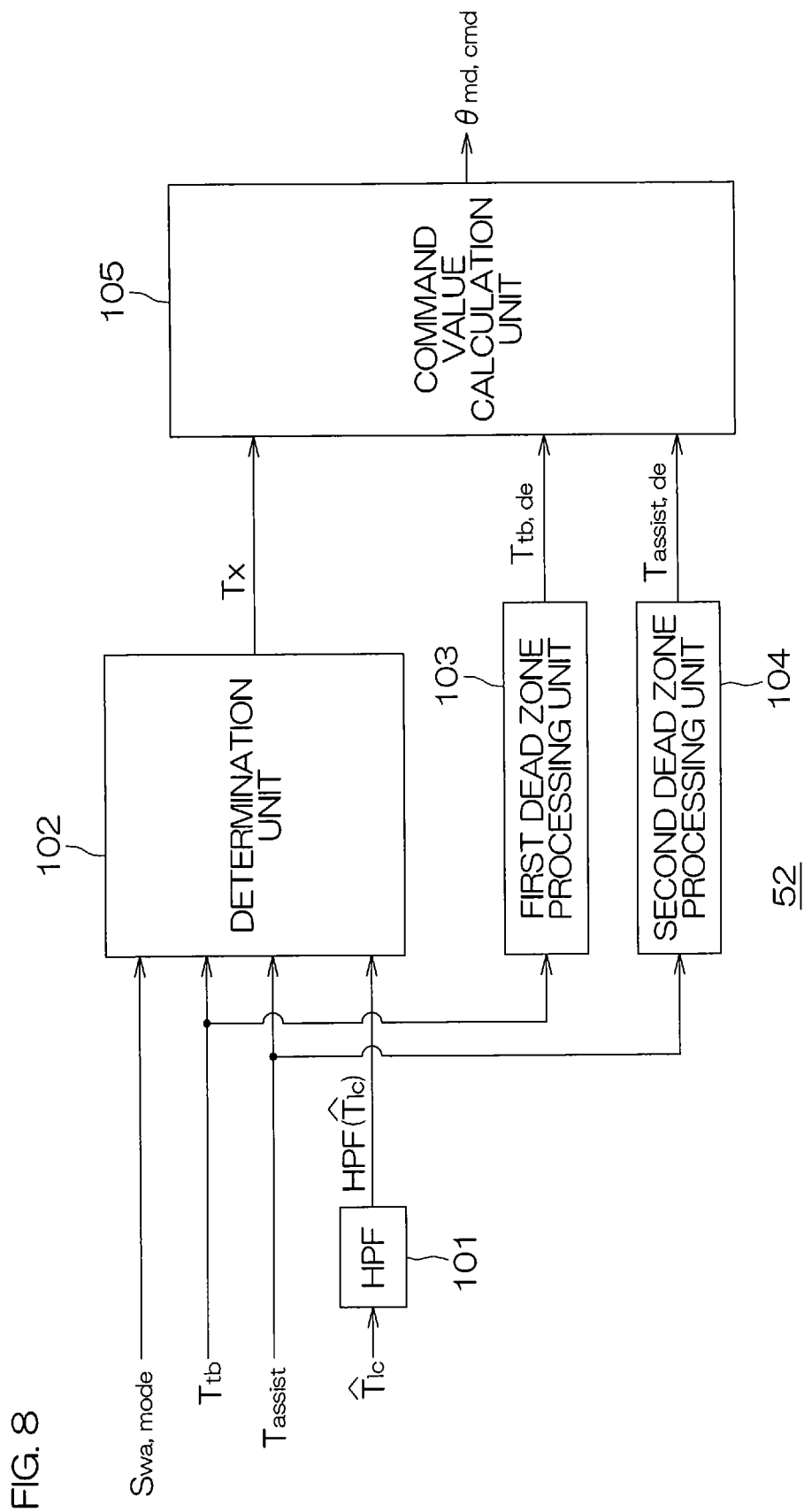
FIG. 8 is a block diagram showing the configuration of a manual steering command value calculation unit.

FIG. 8 is a block diagram showing the configuration of the manual steering command value calculation unit 52.

The manual steering command value calculation unit 52 includes a high-pass filter 101, a determination unit 102, a first dead zone processing unit 103, a second dead zone processing unit 104, and a command value calculation unit 105.

The high-pass filter 101 extracts a high frequency component HPF($\hat{T}_{lc}$) of the estimated disturbance torque value $\hat{T}_{lc}$ estimated by the disturbance torque estimation unit 64. In the present embodiment, the high frequency component HPF($\hat{T}_{lc}$) of the estimated disturbance torque value $\hat{T}_{lc}$ is an example of "road information including at least information on the road reaction torque" in the present invention.

Figure 9:
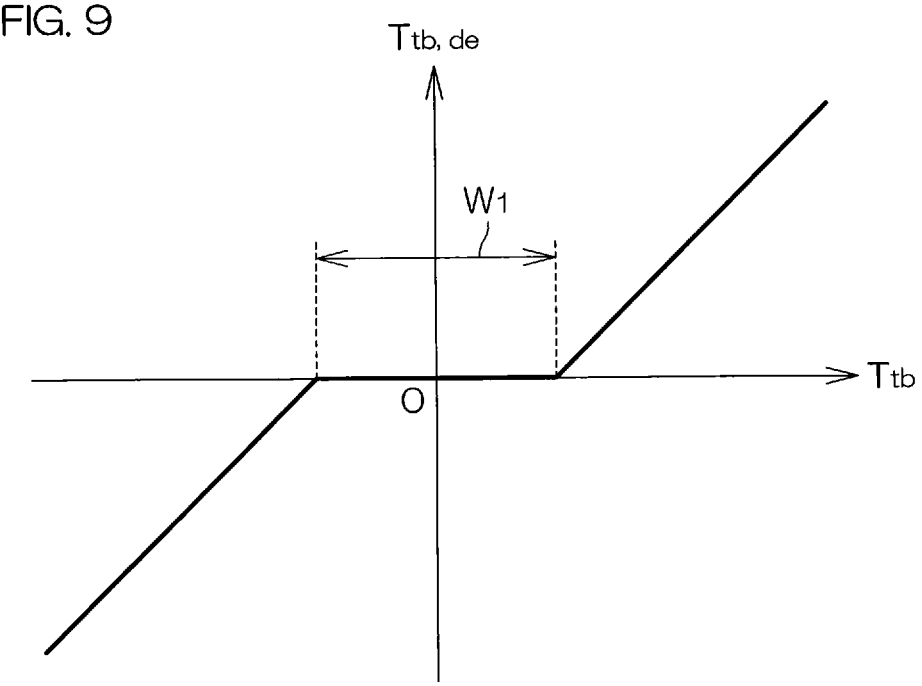
FIG. 9 is a graph showing input/output characteristics of a rust dead zone processing unit.

The steering torque $T_{tb}$ is input to the first dead zone processing unit 103. Assuming that a first dead zone range is $W_1$ as shown in FIG. 9, the first dead zone processing unit 103 outputs zero as a steering torque $T_{tb,de}$ after a first dead zone process when the steering torque $T_{tb}$ is within a range of $-W_1/2$ or larger and $W_1/2$ or smaller (first dead zone region).

In a region in which the steering torque $T_{tb}$ is smaller than $-W_1/2$, the first dead zone processing unit 103 outputs $[T_{tb}+(W_1/2)]$ as the steering torque $T_{tb,de}$ after the first dead zone process. In a region in which the steering torque $T_{tb}$ is larger than $W_1/2$, the first dead zone processing unit 103 outputs $[T_{tb}-(W_1/2)]$ as the steering torque $T_{tb,de}$ after the first dead zone process.

Figure 10:
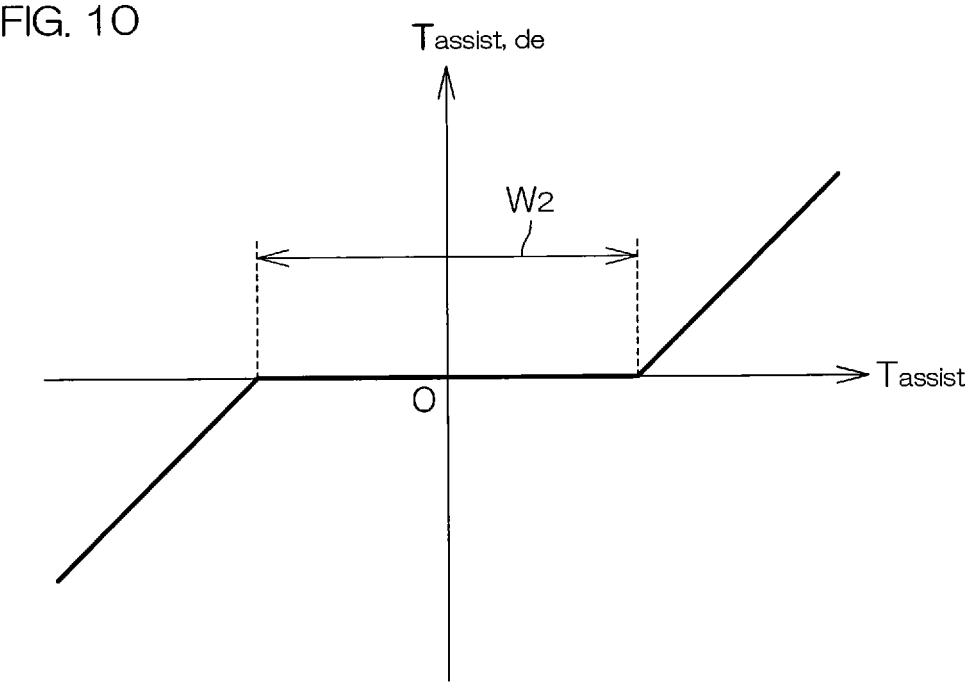
FIG. 10 is a graph showing input/output characteristics of a second dead zone processing unit.

The assist torque $T_{assist}$ is input to the second dead zone processing unit 104. Assuming that a second dead zone range is $W_2$, the second dead zone processing unit 104 outputs zero as an assist torque $T_{assist,de}$ after a second dead zone process as shown in FIG. 10 when the assist torque $T_{assist}$ is within a range of $-W_2/2$ or larger and $W_2/2$ or smaller (second dead zone region).

In a region in which the assist torque $T_{assist}$ is smaller than $-W_2/2$, the second dead zone processing unit 104 outputs $[T_{assist}+(W_2/2)]$ as the assist torque $T_{assist,de}$ after the second dead zone process. In a region in which the assist torque $T_{assist}$ is larger than $W_2/2$, the second dead zone processing unit 104 outputs $[T_{assist}-(W_2/2)]$ as the assist torque $T_{assist,de}$ after the second dead zone process.

The determination unit 102 determines whether to use the high frequency component $HPF(\hat{T}_{lc})$ of the estimated disturbance torque value $\hat{T}_{lc}$ to calculate the manual steering command value $\theta_{md,cmd}$ based on the alert mode signal $S_{wa,mode}$, the steering torque $T_{tb}$, and the assist torque command value $T_{assist}$. When determination is made to use the high frequency component $HPF(\hat{T}_{lc})$ of the estimated disturbance torque value $\hat{T}_{lc}$ to calculate the manual steering command value $\theta_{md,cmd}$, the determination unit 102 sets $HPF(\hat{T}_{lc})$ as a variable $T_x$. When determination is made not to use the high frequency component $HPF(\hat{T}_{lc})$ of the estimated disturbance torque value $\hat{T}_{lc}$ to calculate the manual steering command value $\theta_{md,cmd}$, the determination unit 102 sets 0 as the variable $T_x$.

Figure 11A:
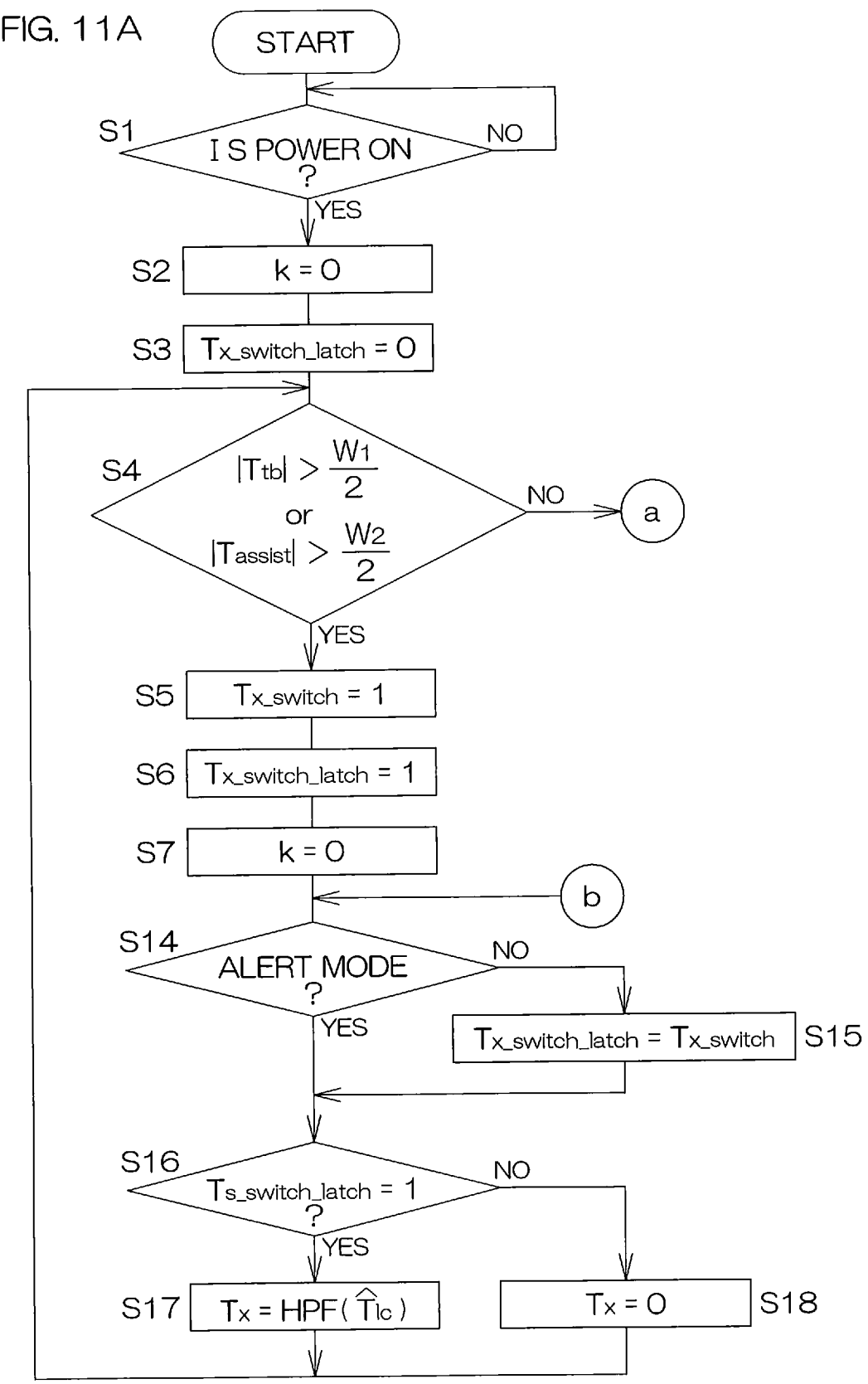
FIG. 11A is a flowchart showing part of the procedure of a determination process performed by a determination unit in a driving assist mode.
Figure 11B:
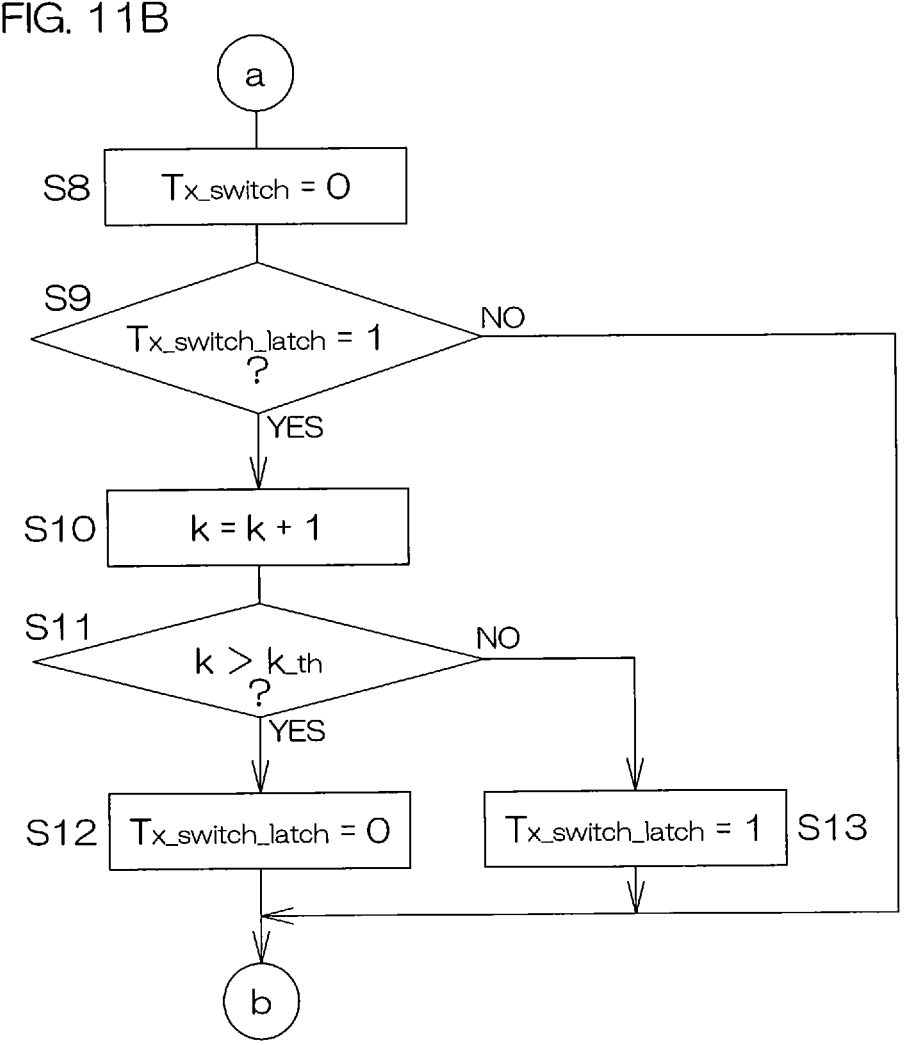
FIG. 11B is a flowchart showing part of the procedure of the determination process performed by the determination unit in the driving assist mode.

FIGS. 11A and 11B are flowcharts showing the procedure of a determination process performed by the determination unit 102 in the driving assist mode.

The determination process shown in steps S4 to S18 in FIGS. 11A and 11B is repeatedly executed at every predetermined calculation period $\Delta t$.

Referring to FIG. 11A, when the power is turned on (step S1), the determination unit 102 sets a count value k to 0 (step S2) and sets a latch flag $T_{x\_switch\_latch}$ to 0 (step S3). Then, the determination unit 102 proceeds to step S4.

In step S4, the determination unit 102 determines whether a determination condition that an absolute value $|T_{tb}|$ of the steering torque $T_{tb}$ is outside the first dead zone region or an absolute value $|T_{assist}|$ of the assist torque command value $T_{assist}$ is outside the second dead zone region is satisfied. Specifically, when at least one of a first condition that $|T_{tb}|>(W_1/2)$ and a second condition that $|T_{assist}|>(W_2/2)$ is satisfied, the determination unit 102 determines that the determination condition is satisfied. When neither the first condition nor the second condition is satisfied, that is, when the steering torque $T_{tb}$ is within the first dead zone region and the assist torque command value $T_{assist}$ is within the second dead zone region, the determination unit 102 determines that the determination condition is not satisfied.

When determination is made in step S4 that the determination condition is satisfied (step S4: YES), the determination unit 102 sets a changeover flag $T_{x\_switch}$ to 1 (step S5). The determination unit 102 sets the latch flag $T_{x\_switch\_latch}$ to 1 (step S6). After the count value k is set to 0 (step S7), the determination unit 102 proceeds to step S14.

When determination is made in step S4 that the determination condition is not satisfied (step S4: NO), the determination unit 102 sets the changeover flag $T_{x\_switch}$ to 0 as shown in FIG. 11B (step S8).

Next, the determination unit 102 determines whether the latch flag $T_{x\_switch\_latch}$ is set to 1 (step S9).

When the latch flag $T_{x\_switch\_latch}$ is set to 0 (step S9: NO), the determination unit 102 proceeds to step S14.

When determination is made in step S9 that the latch flag $T_{x\_switch\_latch}$ is set to 1 (step S9: YES), the determination unit 102 increments the count value k by 1 (step S10). Then, the determination unit 102 determines whether the count value k is larger than a predetermined threshold value $k_{\_th}$ (step S11). In other words, determination is made as to whether a period from the time when the count value k is set to 0 in the most recent step S7 to the current time is longer than a predetermined period $T_s$ corresponding to $(k_{\_th} \times \Delta t)$. An example of setting the predetermined period $T_s$ will be described later.

When the count value k is larger than the predetermined threshold value $k_{\_th}$ (step S11: YES), the determination unit 102 sets the latch flag $T_{x\_switch\_latch}$ to 0 (step S12) and then proceeds to step S14.

When determination is made in step S11 that the count value k is equal to or smaller than the predetermined threshold value $k_{\_th}$ (step S11: NO), the determination unit 102 sets the latch flag $T_{x\_switch\_latch}$ to 1 (step S13) and then proceeds to step S14.

Returning to FIG. 11A, the determination unit 102 determines in step S14 whether the alert mode is currently enabled based on the alert mode signal $S_{wa,mode}$. When the alert mode is currently enabled (step S14: YES), the determination unit 102 proceeds to step S16.

When determination is made in step S14 that the alert mode is not currently enabled (step S14: NO), the determination unit 102 sets the value of the changeover flag $T_{x\_switch}$ as the latch flag $T_{x\_switch\_latch}$ (step S15). Then, the determination unit 102 proceeds to step S16.

In step S16, the determination unit 102 determines whether the latch flag $T_{x\_switch\_latch}$ is 1. When the latch flag $T_{x\_switch\_latch}$ is 1 (step S16: YES), the determination unit 102 sets $HPF(\hat{T}_{lc})$ as $T_x$ (step S17). Then, the determination unit 102 returns to step S4.

When determination is made in step S16 that the latch flag $T_{x\_switch\_latch}$ is 0 (step S16: NO), the determination unit 102 sets 0 as $T_x$ (step S18). Then, the determination unit 102 returns to step S4.

An example of setting the predetermined period $T_s$ will be described. The example of setting the predetermined period $T_s$ will be described taking as an example a case where the vibration waveform during the alert mode is, for example, a waveform shown in FIG. 12. In the alert mode shown in FIG. 12, one set is three times of repetition of a pattern in which a target vibration waveform of a 20 Hz sine wave is repeated for six periods and then an interval period $T_A$ of 0.1 seconds is provided.

The predetermined period $T_s$ is preferably equal to or longer than the interval period $T_A$, and more preferably equal to or longer than a period $T_B$ obtained by adding one period of the target vibration waveform to the interval period $T_A$. The predetermined period $T_s$ is preferably equal to or shorter than a total period $T_C$ of one set in the alert mode.

Figure 12:
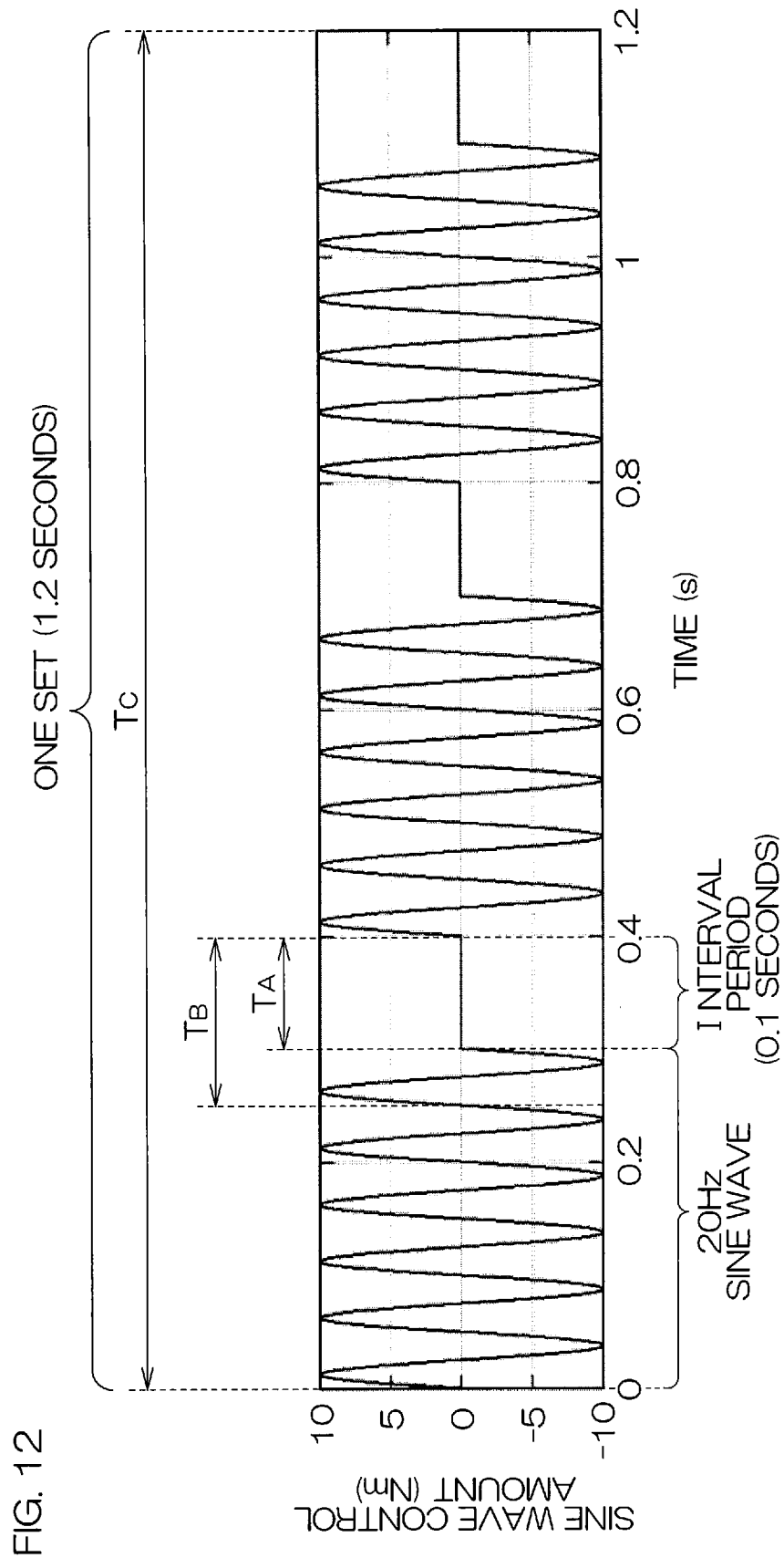
FIG. 12 is a time chart showing an example of a vibration waveform during an alert mode.

In the case of the alert mode shown in FIG. 12, assuming that a period $T_w$ of the sine wave that is the target vibration waveform is 0.05 seconds, the predetermined period $T_s$ is preferably equal to or longer than $2 \times T_w$ (=0.1 seconds), and more preferably equal to or longer than $3 \times T_w$ (=0.15 seconds). The predetermined period $T_s$ is preferably equal to or shorter than $24 \times T_w$ (=1.2 seconds).

According to the determination process in FIG. 11, when at least one of the steering torque $T_{tb}$ and the assist torque command value $T_{assist}$ is outside the dead zone region (when the determination condition is satisfied), $T_{x\_switch}=1$, $T_{x\_switch\_latch}=1$, and k=0 (see steps S5, S6, S7). In this case, $T_{x\_switch\_latch}=1$ in step S15 even if the alert mode is not currently enabled. Therefore, $T_x=\mathrm{HPF}(\hat{T}_{lc})$ regardless of whether the alert mode is currently enabled (see steps S16, S17).

When both the steering torque $T_{tb}$ and the assist torque command value $T_{assist}$ are within the dead zone regions (when the determination condition is not satisfied), $T_{x\_switch}=0$ (see step S8). When determination is made in this case that $T_{x\_switch\_latch}=0$ in step S9, $T_{x\_switch\_latch}=0$ in step S15 even if the alert mode is not currently enabled. Therefore, $T_x=0$ regardless of whether the alert mode is currently enabled (see steps S16, S18).

That is, when at least one of the steering torque $T_{tb}$ and the assist torque command value $T_{assist}$ is outside the dead zone region (when the determination condition is satisfied), $T_x=\mathrm{HPF}(\hat{T}_{lc})$ in principle. When both the steering torque $T_{tb}$ and the assist torque command value $T_{assist}$ are within the dead zone regions (when the determination condition is not satisfied), $T_x=0$ in principle.

When determination is made in step S9 that $T_{x\_switch\_latch}=1$ and the elapsed period from the time when the count value k is reset in the most recent step S7 is longer than the predetermined period $T_s$, $T_{x\_switch\_latch}=0$ (see step S12). In this case, $T_{x\_switch\_latch}=0$ in step S15 even if the alert mode is not currently enabled. Therefore, $T_x=0$ regardless of whether the alert mode is currently enabled (see steps S16, S18).

When determination is made in step S9 that $T_{x\_switch\_latch}=1$ and the elapsed period from the time when the count value k is reset in the most recent step S7 is equal to or shorter than the predetermined period $T_s$, $T_{x\_switch\_latch}=1$ though the determination condition is not satisfied (see step S13). In this case, $T_{x\_switch\_latch}=0$ through the process in step S15 when the alert mode is not currently enabled. Therefore, $T_x=0$ (see steps S16, S18). When the alert mode is currently enabled, the process in step S15 is not performed. Therefore, $T_x=\mathrm{HPF}(\hat{T}_{lc})$ (see steps S16, S17).

That is, $T_x=\mathrm{HPF}(\hat{T}_{lc})$ when determination is made that the determination condition is not satisfied in a calculation period following the calculation period in which the count value k is set to 0 in step S7, the determination condition continues to be unsatisfied, the elapsed period from the time when the count value k is set to 0 in step S7 is equal to or shorter than the predetermined period $T_s$, and the alert mode is currently enabled. After that, $T_x=0$ when the determination condition continues to be unsatisfied.

This prevents frequent repetition of the state in which $T_x=\mathrm{HPF}(\hat{T}_{lc})$ and the state in which $T_x=0$ during the alert mode.

The command value calculation unit 105 calculates the manual steering command value $\theta_{md,cmd}$ using a reference EPS model. The reference EPS model is a single inertia model including a lower column.

Specifically, the command value calculation unit 105 calculates the manual steering command value $\theta_{md,cmd}$ by solving the differential equation given by the following expression (10).

$$J_{md}\cdot d^2\theta_{md,cmd}/dt^2 = T_{tb,de}+N\cdot T_{assist,de}-k_1\cdot\theta_{md,cmd}-c_1(d\theta_{md,cmd}/dt)-T_x \qquad (10)$$

In the expression (10), $J_{md}$ is the inertia of the lower column, $T_{tb,de}$ is the steering torque after the first dead zone process, N is the reduction ratio of the speed reducer 19, $T_{assist,de}$ is the assist torque after the second dead zone process, $k_1$ is a spring constant, $c_1$ is a viscous damping coefficient, and $T_x$ is the variable set by the determination unit 102. In the present embodiment, the spring constant $k_1$ and the viscous damping coefficient $c_1$ are preset.

Hereinafter, a motor control ECU that calculates the manual steering command value $\theta_{md,cmd}$ constantly using $\mathrm{HPF}(\hat{T}_{lc})$ as $T_x$ in the expression (10) regardless of the steering torque $T_{tb}$, the assist torque command value $T_{assist}$, and the alert mode signal $S_{wa,mode}$ will be referred to as a first comparative example.

In the first comparative example, a road reaction force based on $\mathrm{HPF}(\hat{T}_{lc})$ is generated even when the driver does not intervene in steering in the driving assist mode. Therefore, there is a problem that the performance to follow a target travel route is poor.

Therefore, it is conceivable to set $\mathrm{HPF}(\hat{T}_{lc})$ as $T_x$ in the expression (10) when at least one of the steering torque $T_{tb}$ and the assist torque command value $T_{assist}$ is outside the dead zone region, and to set 0 as $T_x$ in the expression (10) when both the steering torque $T_{tb}$ and the assist torque command value $T_{assist}$ are within the dead zone regions. A motor control ECU that calculates the manual steering command value $\theta_{md,cmd}$ using $T_x$ set in this manner will be referred to as a second comparative example.

That is, in the second comparative example, $\mathrm{HPF}(\hat{T}_{lc})$ is set as $T_x$ when positive determination (YES) is made in step S4 of FIG. 11, and 0 is set as $T_x$ when negative determination (NO) is made in step S4 of FIG. 11. In other words, $\mathrm{HPF}(\hat{T}_{lc})$ is set as $T_x$ when $T_{x\_switch}=1$, and 0 is set as $T_x$ when $T_{x\_switch}=0$.

In the second comparative example, the road reaction force based on $\mathrm{HPF}(\hat{T}_{lc})$ is not generated when the driver does not intervene in steering in the driving assist mode (when both $T_{tb}$ and $T_{assist}$ are within the dead zone regions). Therefore, the performance to follow the target travel route is improved as compared to the first comparative example.

In the alert mode, however, the state in which at least one of the steering torque $T_{tb}$ and the assist torque command value $T_{assist}$ is outside the dead zone region and the state in which both the steering torque $T_{tb}$ and the assist torque command value $T_{assist}$ are within the dead zone regions are frequently switched by the vibration torque command value $T_{wa,cmd}$. As a result, the manual steering command value $\theta_{md,cmd}$ changes in short periods, and the steering angle changes excessively.

In the present embodiment, in the case where the alert mode is not currently enabled, as in the second comparative example, $\mathrm{HPF}(\hat{T}_{lc})$ is set as $T_x$ when at least one of the steering torque $T_{tb}$ and the assist torque command value $T_{assist}$ is outside the dead zone region, and 0 is set as $T_x$ when both the steering torque $T_{tb}$ and the assist torque command value $T_{assist}$ are within the dead zone regions. Thus, the performance to follow the target travel route is improved as compared to the first comparative example.

In the present embodiment, when the first state in which at least one of the steering torque $T_{tb}$ and the assist torque command value $T_{assist}$ is outside the dead zone region has changed to the second state in which both the steering torque $T_{tb}$ and the assist torque command value $T_{assist}$ are within the dead zone regions during the alert mode, $\mathrm{HPF}(\hat{T}_{lc})$ continues to be set as $T_x$ until the predetermined period $T_x$ elapses from the time when the first state has changed to the second state. This prevents frequent repetition of the state in which $T_x=\mathrm{HPF}(\hat{T}_{lc})$ and the state in which $T_x=0$ during the alert mode. Thus, an excessive change in the steering angle during the alert mode can be suppressed because the change in the manual steering command value $\theta_{md,cmd}$ in short periods can be suppressed during the alert mode.

Although the embodiment and modifications of the present invention are described above, the present invention may also be implemented in other forms.

In the embodiment described above, the determination unit 102 sets HPF($^{\wedge}T_{lc}$) as $T_x$ in step S17 of FIG. 11A. However, the determination unit 102 may set the estimated disturbance value $^{\wedge}T_{lc}$ as $T_x$ in step S17 of FIG. 11A.

In step S17 of FIG. 11A, the determination unit 102 may set, as $T_x$, HPF($^{\wedge}T_{lc}$-$T_{tb}$) that is a high frequency component of a value ($^{\wedge}T_{lc}$-$T_{tb}$) obtained by subtracting the steering torque $T_{tb}$ from the estimated disturbance value $^{\wedge}T_{lc}$. HPF ($^{\wedge}T_{lc}$-$T_{tb}$) can be obtained by performing a high-pass filtering process on ($^{\wedge}T_{lc}$-$T_{tb}$).

In step S17 of FIG. 11A, the determination unit 102 may set, as $T_x$, the value ($^{\wedge}T_{lc}$-$T_{tb}$) obtained by subtracting the steering torque $T_{tb}$ from the estimated disturbance value $^{\wedge}T_{lc}$.

In step S17 of FIG. 11A, the determination unit 102 may set, as $T_x$, HPF($^{\wedge}T_{lc}$-$T_{tb}$-$T_f$) that is a high frequency component of a value ($^{\wedge}T_{lc}$-$T_{tb}$-$T_f$) obtained by subtracting the steering torque $T_{tb}$ and the friction torque $T_f$ from the estimated disturbance value $^{\wedge}T_{lc}$. HPF($^{\wedge}T_{lc}$-$T_{tb}$-$T_f$) can be obtained by performing a high-pass filtering process on ($^{\wedge}T_{lc}$-$T_{tb}$-$T_f$). The friction torque $T_f$ can be estimated using, for example, a friction model that estimates friction generated in the speed reducer 19.

In step S17 of FIG. 11A, the determination unit 102 may set, as $T_x$, the value ($^{\wedge}T_{lc}$-$T_{tb}$-$T_f$) obtained by subtracting the steering torque $T_{tb}$ and the friction torque $T_f$ from the estimated disturbance value $^{\wedge}T_{lc}$.

Instead of the second dead zone processing unit 104 described above, a third dead zone processing unit may be provided for the steering torque $T_{tb}$ input to the assist torque command value setting unit 51. In this case, the dead zone range of the third dead zone processing unit may be the same value as the dead zone range $W_1$ of the first dead zone processing unit 103, or may be a different value from the dead zone range $W_1$. In this case, the determination unit 102 determines in step S4 of FIG. 11A whether a determination condition that the absolute value $|T_{tb}|$ of the steering torque $T_{tb}$ is outside the first dead zone region or the absolute value $|T_{tb}|$ of the steering torque $T_{tb}$ is outside the dead zone region of the third dead zone processing unit is satisfied.

Instead of the first dead zone processing unit 103 and the second dead zone processing unit 104 described above, a fourth dead zone processing unit may be provided for the common steering torque $T_{tb}$ input to the command value calculation unit 105 and the assist torque command value setting unit 51. In this case, the determination unit 102 determines in step S4 of FIG. 11A whether a determination condition that the absolute value $|T_{tb}|$ of the steering torque $T_{tb}$ is outside a dead zone region of the fourth dead zone processing unit is satisfied.

In the embodiment described above, the angle control unit 54 (see FIG. 4) includes the feedforward control unit 63. However, the feedforward control unit 63 may be omitted. In this case, the feedback control torque Tr calculated by the feedback control unit 62 is basic target torque.

The embodiment described above illustrates the example in which the present invention is applied to motor control for a column type EPS. However, the present invention is also applicable to motor control for an EPS other than the column type. The present invention is also applicable to control for an electric motor for steered angle control of a steer-by-wire system.

Although the embodiment of the present invention is described in detail above, this is merely a specific example used to clarify the technical content of the present invention, and the present invention should not be construed as being limited to the specific example, and the scope of the present invention is limited only by the appended claims.

DESCRIPTION OF THE REFERENCE NUMERALS

1 . . . electric power steering system, 3 . . . steered wheel, 4 . . . steering operation mechanism, 18 . . . electric motor, 51 . . . assist torque command value setting unit, 52 . . . manual steering command value calculation unit, 53 . . . integrated angle command value calculation unit, 54 . . . angle control unit, 55 . . . torque control unit, 56 . . . changeover switch, 57 . . . addition unit, 61 . . . low-pass filter (LPF), 62 . . . feedback control unit, 63 . . . feedforward control unit, 64 . . . disturbance torque estimation unit, 65 . . . torque addition unit, 66 . . . disturbance torque compensation unit, 101 . . . high-pass filter, 102 . . . determination unit, 103 . . . first dead zone processing unit, 104 . . . second dead zone processing unit, 105 . . . command value calculation unit

The invention claimed is:

1. A motor control device that controls drive of an electric motor for steering angle control, the motor control device comprising:
   an assist torque command value setting unit that calculates an assist torque command value using steering torque;
   a manual steering command value calculation unit that calculates a manual steering command value using the steering torque and the assist torque command value;
   an integrated angle command value calculation unit that calculates an integrated angle command value by adding the manual steering command value to an automatic steering command value;
   a control unit that performs angle control on the electric motor based on the integrated angle command value;
   a dead zone processing unit that, assuming that the steering torque input to the manual steering command value calculation unit, the assist torque command value input to the manual steering command value calculation unit, and the steering torque input to the assist torque command value setting unit are input torques, is provided for at least one of the input torques; and
   an alert vibration application unit that applies alert vibration torque as a component of a motor torque command value of the electric motor, wherein
   the manual steering command value calculation unit is configured to use road information including information on a road reaction torque to calculate the manual steering command value when a first condition that the at least one of the input torques for which the dead zone processing unit is provided is outside a dead zone range is satisfied, and not to use the road information to calculate the manual steering command value when the first condition is not satisfied, and
   when the alert vibration torque is being applied, the manual steering command value calculation unit uses the road information to calculate the manual steering command value for a predetermined period from a time when a state in which the first condition is satisfied changes to a state in which the first condition is not satisfied.

2. The motor control device according to claim 1, wherein the dead zone processing unit includes a first dead zone processing unit provided for the steering torque input to the manual steering command value calculation unit, and a second dead zone processing unit provided for the assist torque command value input to the manual steering command value calculation unit.

3. The motor control device according to claim 1, wherein the road information is a high frequency component of an estimated value of disturbance torque that is calculated based on an integrated torque command value according to the integrated angle command value and a steering angle, and is applied to a steering shaft.

4. The motor control device according to claim 1, wherein the alert vibration application unit is configured to output a vibration torque command value according to a target alert vibration waveform, and the vibration torque command value is added to an integrated torque command value according to the integrated angle command value.

5. The motor control device according to claim 1, wherein the alert vibration application unit is configured to output a vibration angle command value according to a target alert vibration waveform, and the vibration angle command value is added to the integrated angle command value.

* * * * *